US009948052B2

(12) United States Patent
Gale et al.

(10) Patent No.: US 9,948,052 B2
(45) Date of Patent: Apr. 17, 2018

(54) METHOD FOR ROUTING A CONDUCTOR ACROSS A TERMINAL BLOCK

(71) Applicant: Allison Transmission, Inc., Indianapolis, IN (US)

(72) Inventors: Richard Gale, Indianpolis, IN (US); Bradley Chamberlin, Pendleton, IN (US)

(73) Assignee: ALLISON TRANSMISSION, INC., Indianappolis, IN (US)

( * ) Notice: Subject to any disclaimer, the term of this patent is extended or adjusted under 35 U.S.C. 154(b) by 616 days.

(21) Appl. No.: 14/494,965

(22) Filed: Sep. 24, 2014

(65) Prior Publication Data

US 2015/0007434 A1     Jan. 8, 2015

Related U.S. Application Data

(63) Continuation of application No. 13/419,105, filed on Mar. 13, 2012, now Pat. No. 8,851,936.

(51) Int. Cl.
*H01R 43/20* (2006.01)
*H01R 9/22* (2006.01)
*H02G 15/02* (2006.01)

(52) U.S. Cl.
CPC ............. *H01R 43/20* (2013.01); *H01R 9/22* (2013.01); *H02G 15/02* (2013.01); *Y10T 29/49169* (2015.01)

(58) Field of Classification Search
CPC ...... H02G 15/02; H02G 15/06; H02G 15/064; H01R 9/22; H01R 9/223; H01R 9/24; H01R 43/20; Y10T 29/49169; Y10T 29/49174; Y10T 29/49171

USPC ................................................... 29/825, 854
See application file for complete search history.

(56) References Cited

U.S. PATENT DOCUMENTS

| 3,257,497 A | 6/1966 | Chase |
| 3,283,186 A | 11/1966 | Perry |
| 3,290,453 A | 12/1966 | Jensen |
| 3,510,822 A | 5/1970 | Patterson |
| 3,850,501 A | 11/1974 | Butterfield et al. |

(Continued)

FOREIGN PATENT DOCUMENTS

JP     H03-150040     6/1991

*Primary Examiner* — Peter DungBa Vo
*Assistant Examiner* — Jeffrey T Carley
(74) *Attorney, Agent, or Firm* — Woodard, Emhardt, Moriarty, McNett & Henry LLP

(57) ABSTRACT

A terminal block for an apparatus includes at least one terminal conductor having a first end that extends to a second end. The first end includes a first connection portion and the second end includes a second connection portion. A non-electrically conductive member covers the at least one terminal conductor. The non-electrically conductive member includes a body having a first end section arranged at the first end extending through an intermediate section to a second end section arranged at the second end. The first end section includes a first opening exposing the first connection portion, and the second end portion includes a second opening exposing the second connection portion. The body further includes a conductor routing system having at least one conductor routing member configured and disposed to restrain and guide a conductor member across the at least one terminal conductor.

9 Claims, 6 Drawing Sheets

(56) References Cited

U.S. PATENT DOCUMENTS

| | | | |
|---|---|---|---|
| 4,361,773 A * | 11/1982 | Mokrzycki | H02K 3/522 310/71 |
| 4,362,351 A | 12/1982 | Wible | |
| 4,712,029 A | 12/1987 | Nold | |
| 5,580,286 A | 12/1996 | Kramer et al. | |
| 5,752,852 A | 5/1998 | Onoda | |
| 6,050,840 A | 4/2000 | Kowalski et al. | |
| 6,503,097 B2 | 1/2003 | Archambault | |
| 6,628,024 B1 | 9/2003 | Mirmobin | |
| 6,664,678 B2 | 12/2003 | Shimizu | |
| 6,897,584 B2 | 5/2005 | Doherty et al. | |
| 6,936,941 B2 | 8/2005 | Oohashi et al. | |
| 6,963,150 B2 | 11/2005 | Isoda et al. | |
| 7,193,344 B2 | 3/2007 | Kabasawa et al. | |
| 7,317,269 B2 | 1/2008 | Boyland et al. | |
| 7,633,198 B2 | 12/2009 | Kirkman et al. | |
| 7,893,581 B2 | 2/2011 | Miura et al. | |
| 7,959,469 B2 | 6/2011 | Kawamura et al. | |
| 8,100,730 B2 | 1/2012 | Hara et al. | |
| 8,362,665 B2 | 1/2013 | Chamberlin et al. | |
| 2004/0119350 A1 * | 6/2004 | Miya | H02K 3/522 310/71 |
| 2005/0218732 A1 | 10/2005 | Boyland et al. | |
| 2010/0139950 A1 | 6/2010 | Chen | |
| 2010/0255728 A1 | 10/2010 | Matsuoka et al. | |
| 2012/0238138 A1 | 9/2012 | Matsuoka et al. | |

* cited by examiner

METHOD FOR ROUTING A CONDUCTOR ACROSS A TERMINAL BLOCK

CROSS-REFERENCE TO RELATED APPLICATION

This application is a continuation of U.S. patent application Ser. No. 13/419,105 filed Mar. 13, 2012, which is hereby incorporated by reference in its entirety.

BACKGROUND OF THE INVENTION

Exemplary embodiments pertain to the art of electrical connections and, more particularly, to a terminal block including a conductor routing system for an apparatus having an electrical component.

Many apparatus' include electrical components. For example, many electric machines include a stator assembly and a rotor assembly arranged in a housing. Electric leads pass from the stator assembly through the housing. In most cases, the electric leads, which take the form of conductors having limited flexibility, exit axially from the housing and terminate at a terminal block. Generally, an interface between the terminal block and the electric leads is provided by ring connectors. More specifically, a ring connector is provided on an end portion of each electric terminal. A bolt passes through each ring connector and into a threaded portion of the terminal block to form a connection to the electrical machine. Once connected, covers, and/or seals are provided to protect the connections) from the elements, foreign object contact, or to provide additional insulation between adjacent connections.

BRIEF DESCRIPTION OF THE INVENTION

Disclosed is a terminal block for an apparatus including at least one terminal conductor having a first end that extends to a second end. The first end includes a first connection portion and the second end includes a second connection portion. A non-electrically conductive member covers the at least one terminal conductor. The non-electrically conductive member includes a body having a first end section extending through an intermediate section to a second end section. The first end section includes a first opening exposing the first connection portion, and the second end portion including a second opening exposing the second connection portion. The body further includes a conductor routing system having at least one conductor routing member configured and disposed to restrain and guide a conductor across the at least one terminal conductor.

Also disclosed is a method of routing a conductor across a terminal block of an apparatus having an electrical component. The method includes guiding the conductor into a first conductor routing member provided on a non-electrically conductive member of the terminal block, passing the conductor across at least one terminal conductor covered by the non-electrically conductive member, and guiding the conductor through a second conductor routing member provided on the non-electrically conductive member of the terminal block.

Further disclosed is an apparatus including a housing, an electrical component arranged within the housing and a terminal block mounted to the housing. The terminal block includes at least one terminal conductor having a first end that extends to a second end. The first end includes a first connection portion and the second end includes a second connection portion electrically coupled to the electrical component. A non-electrically conductive member covers the at least one terminal conductor. The non-electrically conductive member includes a body having a first end section extending through an intermediate section to a second end section. The first end section includes a first opening exposing the first connection portion, and the second end portion including a second opening exposing the second connection portion. The body further includes a conductor routing system having at least one conductor routing member configured and disposed to restrain and guide a conductor across the at least one terminal conductor.

BRIEF DESCRIPTION OF THE DRAWINGS

The following descriptions should not be considered limiting in any way. With reference to the accompanying drawings, like elements are numbered alike.

DETAILED DESCRIPTION OF THE INVENTION

Figure 1:
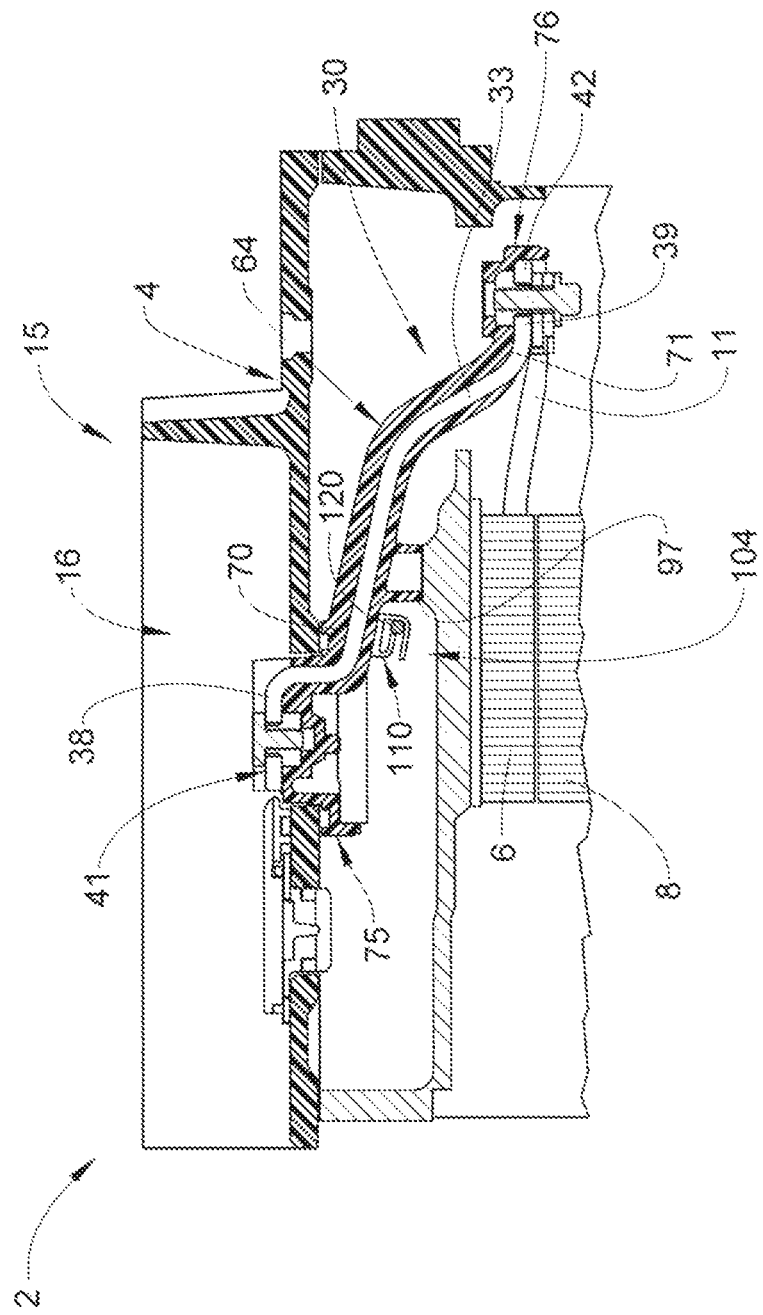
FIG. 1 depicts a partial cross-sectional view of an electric machine housing illustrating a terminal block including a conductor routing system in accordance with an exemplary embodiment.
Figure 2:
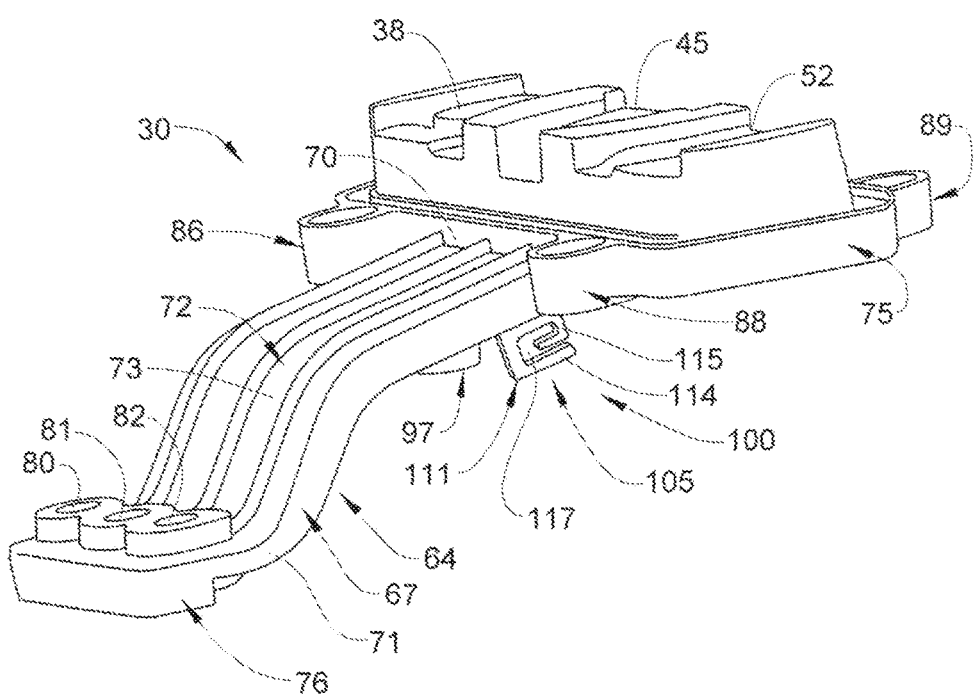
FIG. 2 depicts a lower right perspective view of the terminal block of FIG. 1.
Figure 3:
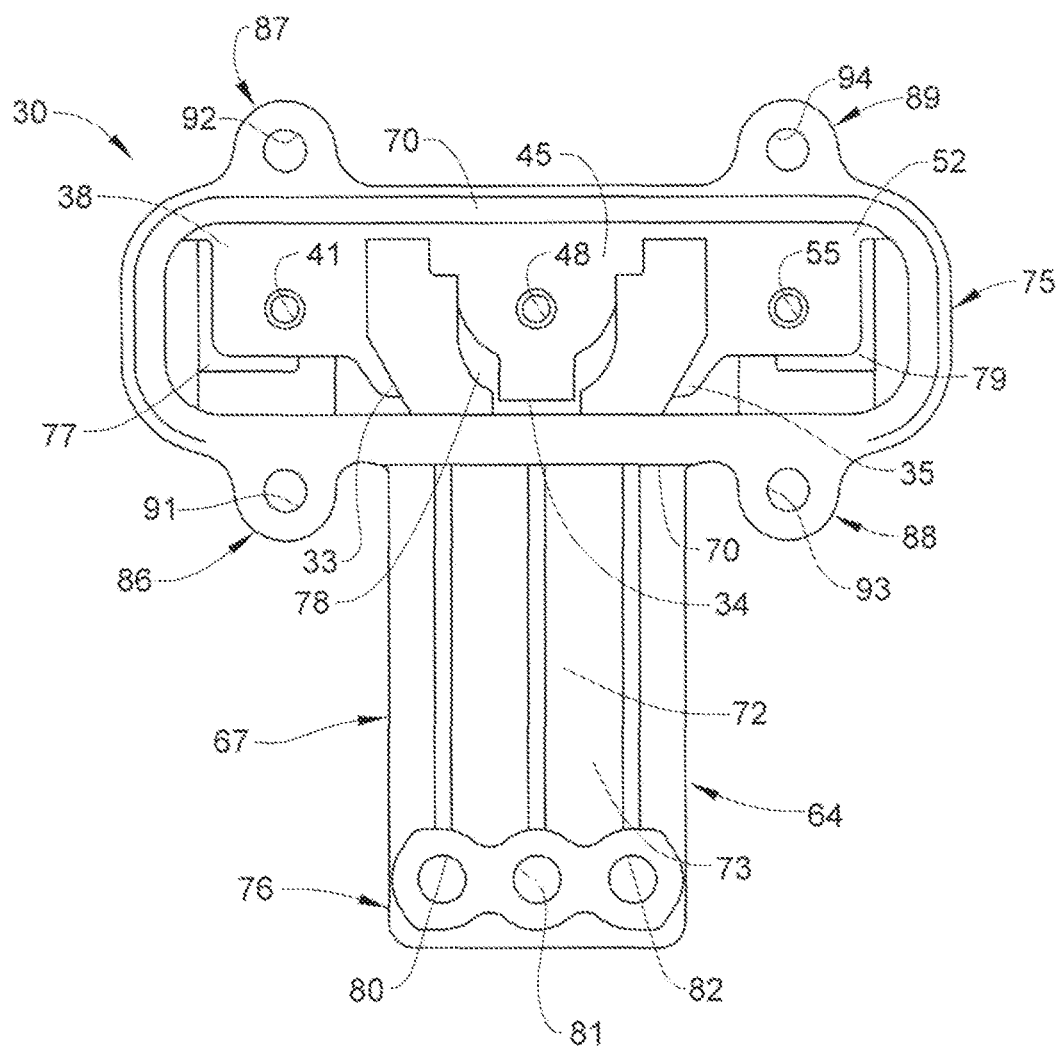
FIG. 3 depicts a top plan view of the terminal block of FIG. 2.
Figure 4:
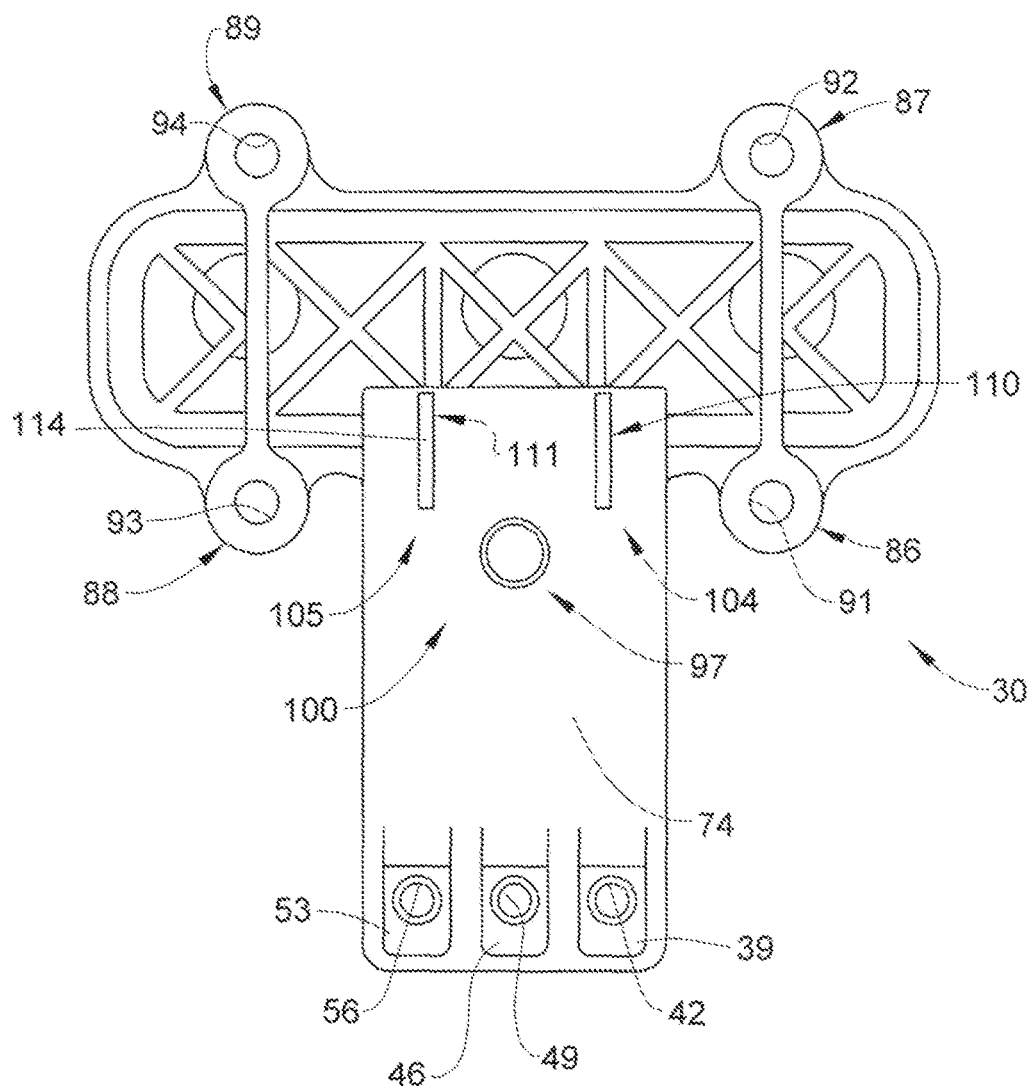
FIG. 4 is a bottom plan view of the terminal block of FIG. 2.

A detailed description of one or more embodiments of the disclosed apparatus and method are presented herein by way of exemplification and not limitation with reference to the Figures.

With initial reference to FIGS. 1-4, an electrical apparatus in accordance with an exemplary embodiment is indicated generally at 2. Electrical apparatus 2 takes the form of an electric motor having a housing 4 and provided with a stationary electrical component or stator 6 and a moveably electrical component or rotor 8. Stator 6 is fixedly mounted to housing 4 while rotor 8 is configured to rotate within housing 4 relative to stator 6. Rotor 8 rotates in response to a magnetic field induced in stator 6. The magnetic field is generated, at least in part, by an electrical current that is passed through stator 6. As such, stator 6 includes a plurality of terminal leads, one of which is indicated at 11, configured to receive an electrical current. In the exemplary embodiment shown, electric component 2 is a three-phase electric motor. As such, stator 6 will include at least three terminal leads. The electrical current is supplied by line conductors (not shown) provided in an electrical connection portion 15 of housing 4. Electrical connection portion 15 includes an interior portion 16 and cover (not shown).

In accordance with an exemplary embodiment, a terminal block 30 extends between electrical connection portion 15 and terminal leads 11. Terminal block 30 provides a bridge between terminal leads 11 and stator 6. Terminal block 30 includes a first terminal conductor 33, a second terminal conductor 34, and a third terminal conductor 35. First terminal conductor 33 includes a first end 38 that extends to a second end 39. First end 38 includes a first connection portion 41 and second end 39 includes a second connection portion 42. Second terminal conductor 34 includes a first end 45 that extends to a second end 46. First end 45 includes a first connection portion 48 and second end 46 includes a second connection portion 49. Third terminal conductor 35 includes a first end 52 that extends to a second end 53. First end 52 includes a first connection portion 55 and second end 53 includes a second connection portion 56. Terminal conductors 33-35 are covered by a non-electrically conductive member 64.

In accordance with the exemplary embodiment, non-electrically conductive member 64 is formed from a high temperature nylon (HTN) and includes a body 67 having a first end section 70 that extends to a second end section 71 through an intermediate portion 72 having first and second opposing surfaces 73 and 74. Of course it should be understood that non-conductive member 64 could be formed from other non-electrically conducting materials. Body 67 includes a first flange 75 arranged at first end section 70 and a second flange 76 arranged at second end section 71. First flange 75 includes a first opening 77, a second opening 78, and a third opening 79. Openings 77-79 expose first ends 38, 45, and 52 of terminal conductors 33-35. Second flange 76 includes a first opening 80, a second opening 81, and a third opening 82. Openings 80-82 provide structure to receive mechanical fasteners that secure flange 76 to housing 4 and expose second ends 39, 46 and 53 for connection to terminal leads 11. In this manner, body 67 provides access to terminal conductors 33-35 for external connection (not separately labeled). Body 67 also includes a plurality of mounting members 86-89 that project outward from first flange 75. Each mounting member 86-89 includes a corresponding mechanical fastener passage 91-94 configured to receive mechanical fasteners (not shown) that join terminal block 30 to housing 4 in external connection portion 15. Body 67 is further shown to include a spacer member 97 that projects outward from second surface 74 of intermediate portion 72. Spacer member 97 supports terminal block 30 within housing 4.

In accordance with an exemplary embodiment, terminal block 30 includes a conductor routing system 100 that is configured to guide conductors passing through housing 4 across terminal conductors 33-35. More specifically, conductor routing system 100 guides conductors passing through housing 4 substantially perpendicularly across terminal conductors 33-35. Conductor routing system 100 includes first and second conductor routing members 104 and 105 projecting outward from second surface 74 of intermediate portion 72. In accordance with the exemplary aspect shown, first conductor mounting member 104 takes the form of a first latch element 110 and second conductor mounting member 105 takes the form of a second latch element 111. First and second latch elements are arranged on opposing lateral sides (not separately labeled) of intermediate portion 72. As each latch element 110, 111 is similarly formed, a detailed description will follow with reference to latch element 111 with an understanding that latch element 110 includes similar structure. Latch element 111 includes a first latch member 114 and a second latch member 115. First and second latch members 114, 115 are generally C-shaped and resiliently biased one toward the other to form a passage 117. In this manner, latch members 110 and 111 receive one or more conductors 120 passing through housing 4 adjacent to terminal block 30. By positioning latch elements 110 and 111 on opposing lateral sides of intermediate portion 72, conductor(s) 120 is constrained to pass substantially perpendicularly across terminal conductors 33-35. Guiding conductor(s) 120 substantially perpendicularly across terminal conductors 33-35 reduces the occurrence of electrical flux between conductor(s) 120 and terminal conductors 33-35.

Figure 5:
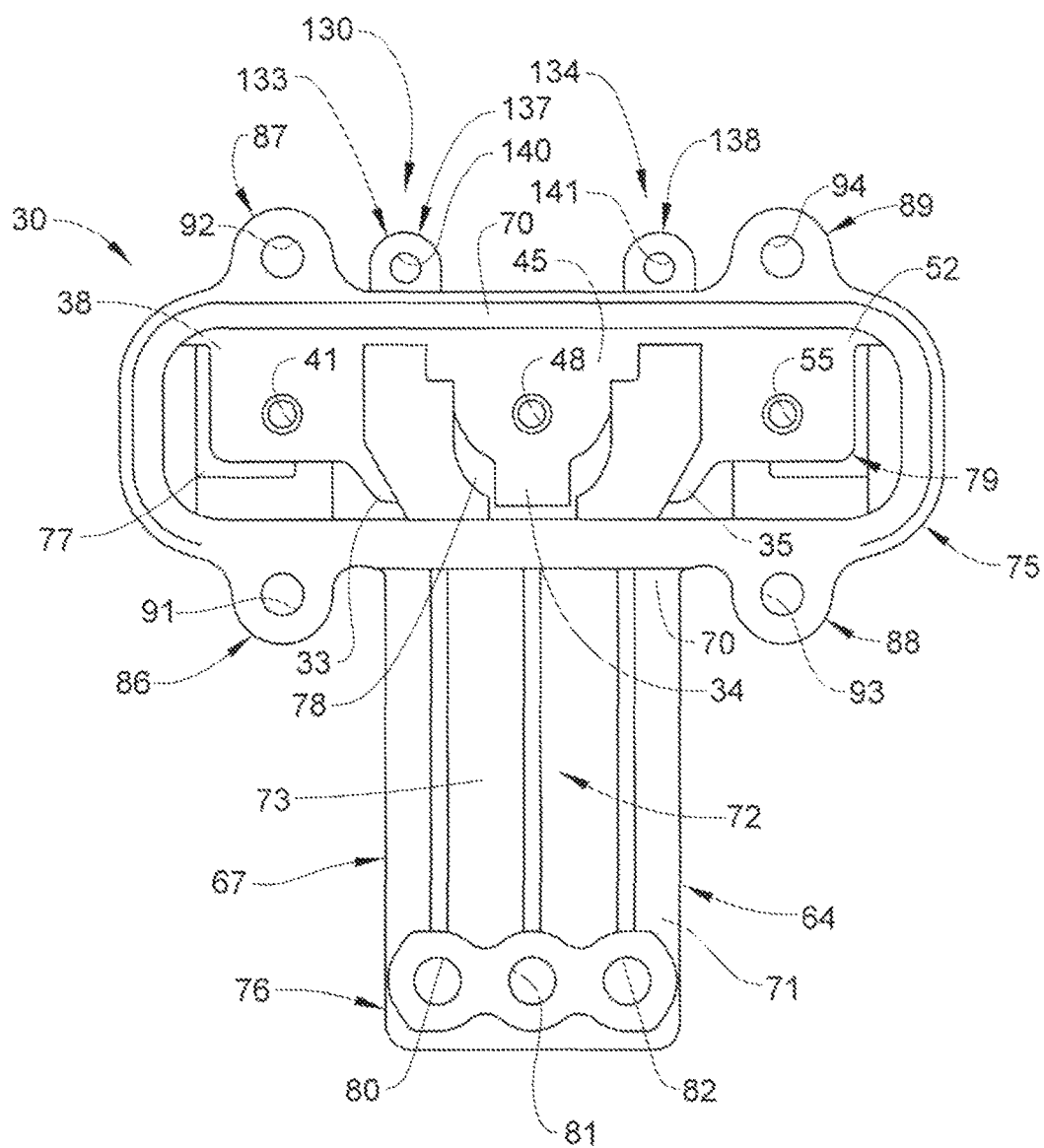
FIG. 5 is a top plan view of a terminal block having a conductor routing system in accordance with another aspect of the exemplary embodiment.

Reference will now be made to FIG. 5, wherein like reference numbers represent corresponding parts in the respective views, in describing a conductor routing system 130 in accordance with another exemplary embodiment of the present invention. Conductor routing system 130 includes a first conductor routing member 133 and a second conductor routing member 134. In accordance with the exemplary aspect shown, first and second conductor mounting members 133 and 134 take the form of first and second tab elements 137 and 138 that project outward from first flange 75 and are arranged between mounting members 87 and 89. First tab element 137 includes a first passage 140 and second tab element 138 includes a second passage 141. Passages 140 and 141 are configured to receive and guide conductor(s) 120 substantially perpendicularly across terminal block 30.

Figure 6:
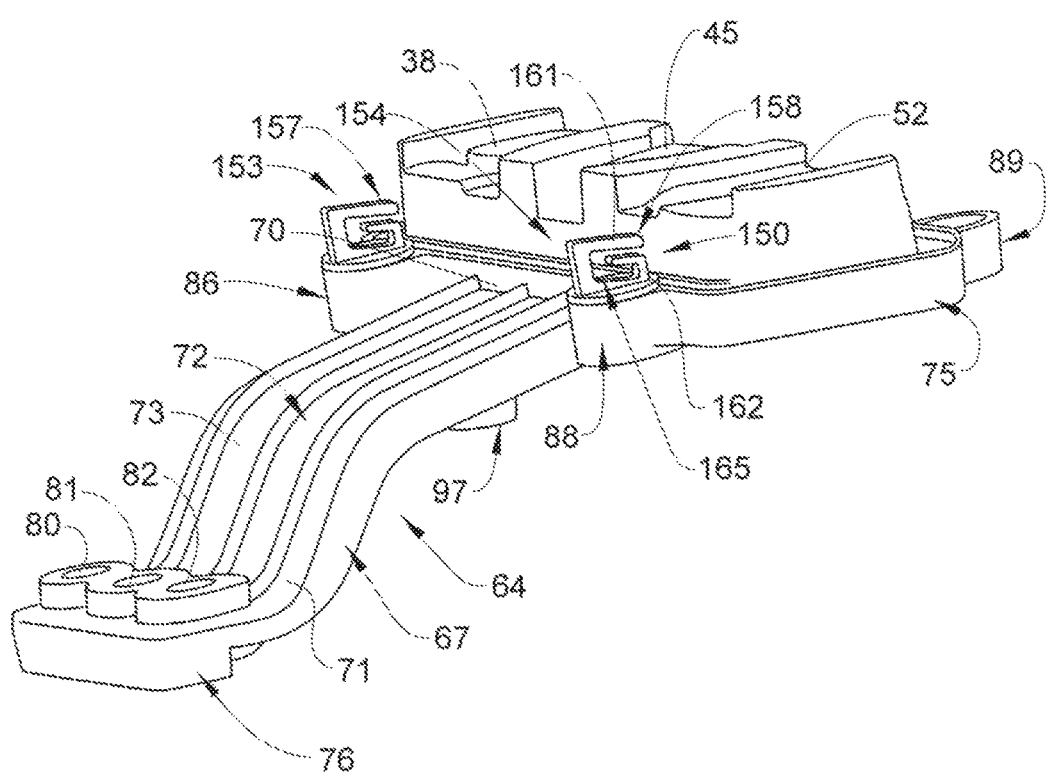
FIG. 6 is a lower right perspective view of a terminal block having a conductor routing system in accordance with still another aspect of the exemplary embodiment.

Reference will now be made to FIG. 6, wherein like reference numbers represent corresponding parts in the respective views, in describing a conductor routing system 150 in accordance with another exemplary embodiment of the present invention. Conductor routing system 150 includes first and second conductor members 153 and 154. First conductor routing member 153 takes the form of a first latch element 157 coupled to mounting member 86. Second conductor routing member 154 takes the form of a latch element 158 coupled to mounting member 88. In the exemplary aspect shown, latch elements 157 and 158 are snap-fit into mounting members 86 and 88, however, it should be understood that latch elements 157 and 158 could be snap-fit to ridges (not separately labeled) formed on intermediate portion 72, or to other features (not shown) provided on terminal block 30. As each latch element 157, 158 is similarly formed, a detailed description will follow with reference to latch element 158 with an understanding that latch element 157 includes similar structure. Latch element 158 includes a first latch member 161 and a second latch member 162. First and second latch member 161, 162 are generally C-shaped and biased one toward the other to form a passage 165. In this manner, latch members 157 and 158 receive one or more conductors 120 passing through housing 4 adjacent to terminal block 30. By securing latch elements 157 and 158 to mounting members 86 and 88, conductor(s) 120 is constrained to pass substantially perpendicularly across terminal conductors 33-35. Guiding conductor(s) 120 substantially perpendicularly across terminal conductors 33-35 reduces the occurrence of electrical flux between conductor(s) 120 and terminal conductors 33-35.

At this point it should be understood that the exemplary embodiments describe a terminal block having conductor routing features that guide a conductor substantially perpendicularly across terminal conductors. The particular angle of the conductor relative to the terminal conductors reduces the occurrence of electrical flux, electro-magnetic interference (EMI), signal distortion or the like that may create undesirable interferences. In addition to reducing various electrical interferences, the conductor routing system also reduces the possibility of pinching the conductors when installing the terminal block. Pinching the conductors can lead to opens, shorts, increased resistance, or other undesirable electrical issues. It should be further understood that the particular form of the electrical conductor routing members can vary in accordance with the exemplary embodiment. While shown as having a generally enclosed passage, other forms of conductors having alternative structure for retaining conductors may also be employed. Finally, while described as routing electrical conductors across the terminal block, the conductor routing system may be employed to guide other forms of conductors such as conductors that pass fluids, gases or the like.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims.

What is claimed is:

1. A method, comprising:
securing a terminal block to a housing with the terminal block extending in a first direction between an electrical connection portion of the housing and one or more terminal leads of a stator of an electric motor, wherein the terminal block includes one or more terminal conductors and a non-electrically conductive member covering the terminal conductors, wherein each of the one or more terminal conductors include a first end with a first connection portion that extends in the first direction to a second end with a second connection portion, wherein the non-electrically conductive member includes a first conductor routing member and a second conductor routing member, wherein the non-electrically conductive member includes a body that has a first end section that extends through an intermediate section to a second end section, wherein the first end section includes a first opening exposing the first connection portion and the second end section includes a second opening exposing the second connection portion, wherein said securing includes connecting the one or more terminal conductors at the first connection portion to the electrical connection portion of the housing;
connecting the one or more terminal conductors at the second opening in the second connection portion of the terminal block to the one or more terminal leads of the stator; and
guiding one or more conductors passing through the housing across the one or more terminal conductors to reduce electrical interference between the one or more conductors and the one or more terminal conductors, wherein said guiding includes
attaching the one or more conductors to the first conductor routing member,
attaching the one or more conductors to the second conductor routing member, and
constraining the conductors to pass across the one or more terminal conductors at a second direction that is substantially perpendicular to the first direction wherein the one or more conductors are electrically isolated from the one or more terminal conductors during said constraining.

2. The method of claim 1, wherein the first conductor routing member and the second conductor routing member are positioned on opposing lateral sides of the terminal block.

3. The method of claim 1, wherein:
the terminal block includes a first flange with one or more mechanical fastener passages; and
said securing includes joining the terminal block to the housing in the electrical connection portion with mechanical fasteners received in the one or more fastener passages.

4. The method of claim 1, further comprising:
supporting the terminal block within the housing with a spacer member projecting from the terminal block.

5. The method of claim 1, wherein:
the electric motor is a three-phase electric motor with three terminal leads; and
the terminal block includes three of the terminal conductors.

6. The method of claim 1, wherein each of the first and second conductor routing members are each latch elements with first and second latch members that are resiliently biased towards one another.

7. The method of claim 6, wherein the first and second latch members are integral to the body.

8. The method of claim 6, further comprising:
wherein said securing the terminal block includes securing with one or more mounting members of the terminal block; and
snap-fitting the latch elements to the one or more mounting members.

9. The method of claim 1, wherein each of the first and second conductor routing members are each tab elements with passages in which the one or more conductors are received.

* * * * *

UNITED STATES PATENT AND TRADEMARK OFFICE
CERTIFICATE OF CORRECTION

PATENT NO. : 9,948,052 B2  
APPLICATION NO. : 14/494965  
DATED : April 17, 2018  
INVENTOR(S) : Richard Gale et al.

Page 1 of 1

It is certified that error appears in the above-identified patent and that said Letters Patent is hereby corrected as shown below:

On the Title Page

Item (72), replace "Indianpolis" with --Indianapolis--  
Item (73), replace "Indianappolis" with --Indianapolis--

Signed and Sealed this  
Twenty-sixth Day of June, 2018

Andrei Iancu  
*Director of the United States Patent and Trademark Office*